Aug. 12, 1958     H. A. SKOG     2,847,047

FRUIT HALVING AND PITTING MACHINE

Original Filed Dec. 14, 1950     8 Sheets-Sheet 1

INVENTOR.
HENRY A. SKOG
BY
MOORE, PRANGLEY & CLAYTON

ATTORNEYS

Aug. 12, 1958 H. A. SKOG 2,847,047
FRUIT HALVING AND PITTING MACHINE
Original Filed Dec. 14, 1950 8 Sheets-Sheet 2

FIG. 3

INVENTOR.
HENRY A. SKOG
BY
MOORE, PRANGLEY & CLAYTON
ATTORNEYS

Aug. 12, 1958  H. A. SKOG  2,847,047
FRUIT HALVING AND PITTING MACHINE
Original Filed Dec. 14, 1950  8 Sheets-Sheet 4

INVENTOR.
HENRY A. SKOG
BY
MOORE, PRANGLEY & CLAYTON
ATTORNEY

United States Patent Office 2,847,047
Patented Aug. 12, 1958

2,847,047
FRUIT HALVING AND PITTING MACHINE

Henry A. Skog, Olympia, Wash., assignor to Special Equipment Company, Portland, Oreg., a corporation of Oregon Original application December 14, 1950, Serial No. 200,705, now Patent No. 2,788,818, dated April 16, 1957. Divided and this application March 15, 1955, Serial No. 494,366

6 Claims. (Cl. 146—28)

This invention relates to a fruit splitting and spreading apparatus useful in machines for processing peaches and other fruit.

This application is a division of my co-pending application for United States Letters Patent Serial No. 200,705, filed December 14, 1950, now Patent No. 2,788,818, entitled "Fruit Treating Machine," and is filed in response to a requirement for restriction.

Among the objects of the invention are to provide, in a fruit splitting, bisecting and sawing, pitting or deseeding machine, wherein the fruit is fed to the bisecting, pitting or deseeding mechanisms at a continuous uniform rate, new or improved means for spreading or separating the fruit halves after bisecting and while the fruit is being carried at such continuous uniform rate from the bisecting mechanism to the pitting or deseeding mechanism; to provide, in a fruit bisecting and pitting or deseeding machine, a stationary spreader member for spreading the fruit halves and the cup sections in which the fruit halves are contained as the fruit is carried in the cup sections from the bisecting means to the pitting or deseeding means; and to provide in a high speed pitting machine receiving whole fruit oriented as to suture plane or long pit axis, splitting and spreading mechanisms for bisecting the fruit along said plane and axis and spreading the fruit halves, while moving at a high speed, without substantially changing the pit axis orientation of the halves so as properly to present the halves to pitting mechanisms for cutting of the half pits therefrom by cuts uniform with the pit axis.

These and other objects of the invention will be hereinafter more fully evident from a perusal of the following specification when taken in connection with the accompanying drawings wherein.

Referring now to the drawings in detail, a preferred embodiment of a machine constructed in accordance with the present invention comprises a machine frame having side plates 2 and 4 (Figs. 1 and 2) spaced apart by a plurality of cross members (not shown). Angle irons (not shown) extend longitudinally of the side plates 2 and 4 at the upper ends thereof and like angle irons (not shown) extend longitudinally of the side plates at the bottom thereof to form supporting feet for the machine frame.

A combined motor and speed reducer gear unit 29 (see Figs. 1 and 2) operates to drive through mechanism hereinafter described, a conveyor 30 for carrying the fruit to halving, spreading and pitting mechanisms. This conveyor 30 is an endless conveyor having a drive shaft 1358 (Fig. 1).

The conveyor, fruit feeding mechanism or device 30 (Figs. 1, and 4 to 12) for receiving whole fruits oriented as to suture plane and carrying them past the splitting, spreading and pitting mechanisms, preferably comprises an endless conveyor consisting of a pair of sprocket chains 22a and 22b (Figs. 1, and 3 to 5) passing at the rear, discharge end of the machine over drive sprockets 35 adjustably secured, as by bolts 39 (Fig. 4) received in arcuate slots 39 in the sprockets, to two collars 35' and 37' (Figs. 3 and 4) secured to a drive shaft 31 journaled in suitable bearing brackets 41 bolted to the side frame plates 2 and 4. The sprocket chains at their forward or feed-in end pass over sprockets 42' and 43' (Figs. 1 and 5) fastened to the cross shaft 33 mounted in bearings 45' bolted to the side frame plates 2 and 4.

Figure 1:
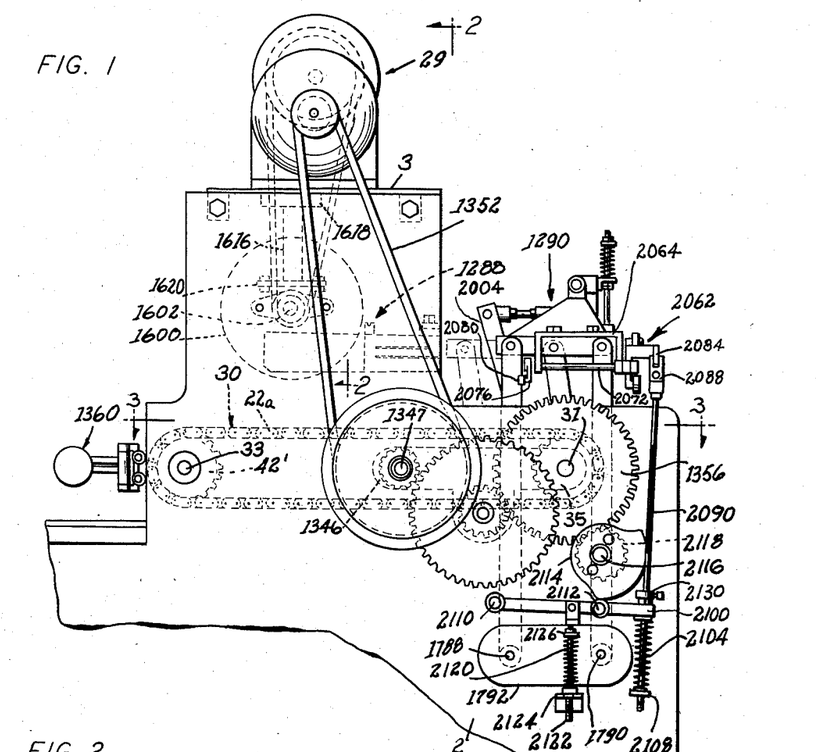
Fig. 1 is a fragmentary view in side elevation of a machine embodying the invention.
Figure 2:
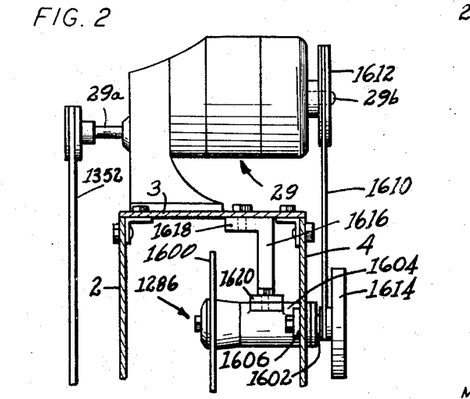
Fig. 2 is a view taken on the line 2—2 of Fig. 1.
Figure 3:
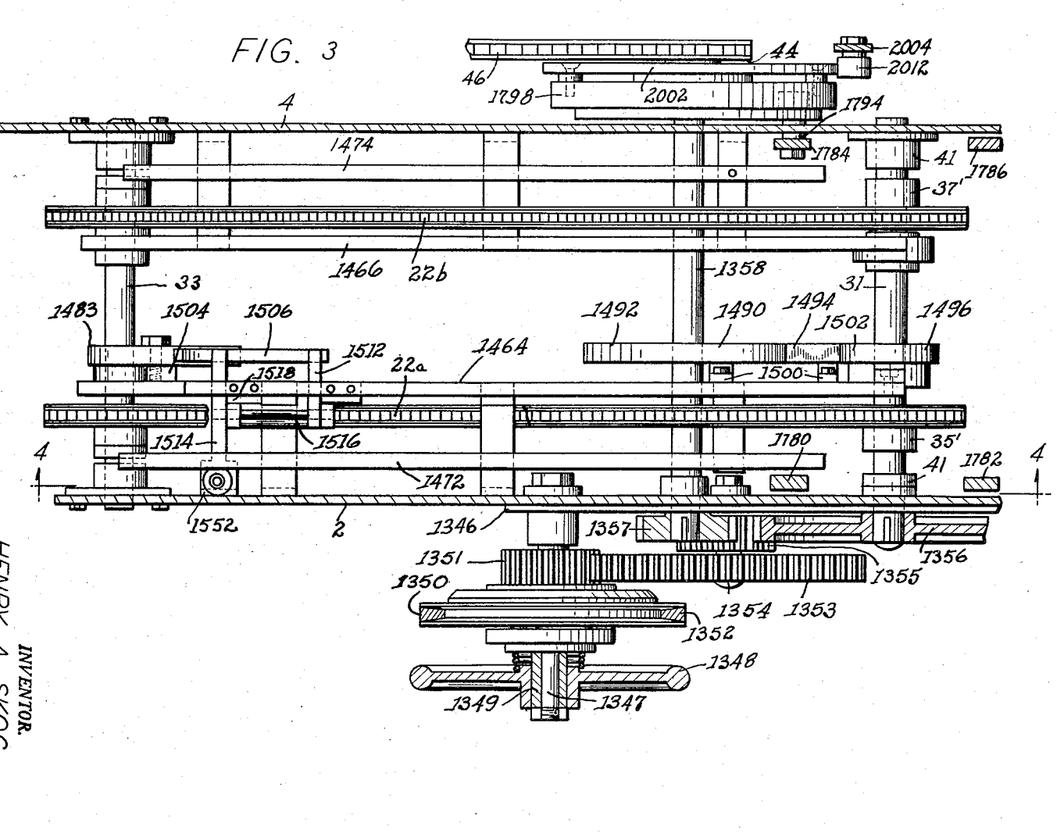
Fig. 3 is an enlarged fragmentary view in horizontal section taken substantially on the line 3—3 of Fig. 1.

An elongated casting 1346, Figs. 1 and 3, is bolted to the side frame plate 2 and has threaded into it a stud shaft 1347 (Fig. 3). A hand wheel 1348 is mounted on the outer end of a rotatable sleeve 1349 on the stud shaft 1347, the sleeve being connectible by a manually operable clutch of any suitable construction to a drive pulley 1350 journaled on the sleeve 1349. The sleeve 1349 is connected or fixed in any suitable manner to a gear 1351. The pulley 1350 is driven through belt 1352 (Figs. 1 and 2) from the slow speed shaft 29a of the combined motor and speed reducer 29. The gear 1351 meshes with and drives a larger gear 1353 journaled on a stud shaft 1354 carried by the casting 1346. The gear 1353 has attached to it a smaller gear 1355 which is also journaled on the stud shaft 1354, the gear 1355 meshing on one side with a drive gear 1356, secured to one end of the conveyor drive shaft 31 and on the other side with a gear 1357 secured to the outer end of the cross shaft 1358 journaled in suitable brackets bolted to the side frame plates 2 and 4.

Figure 4:
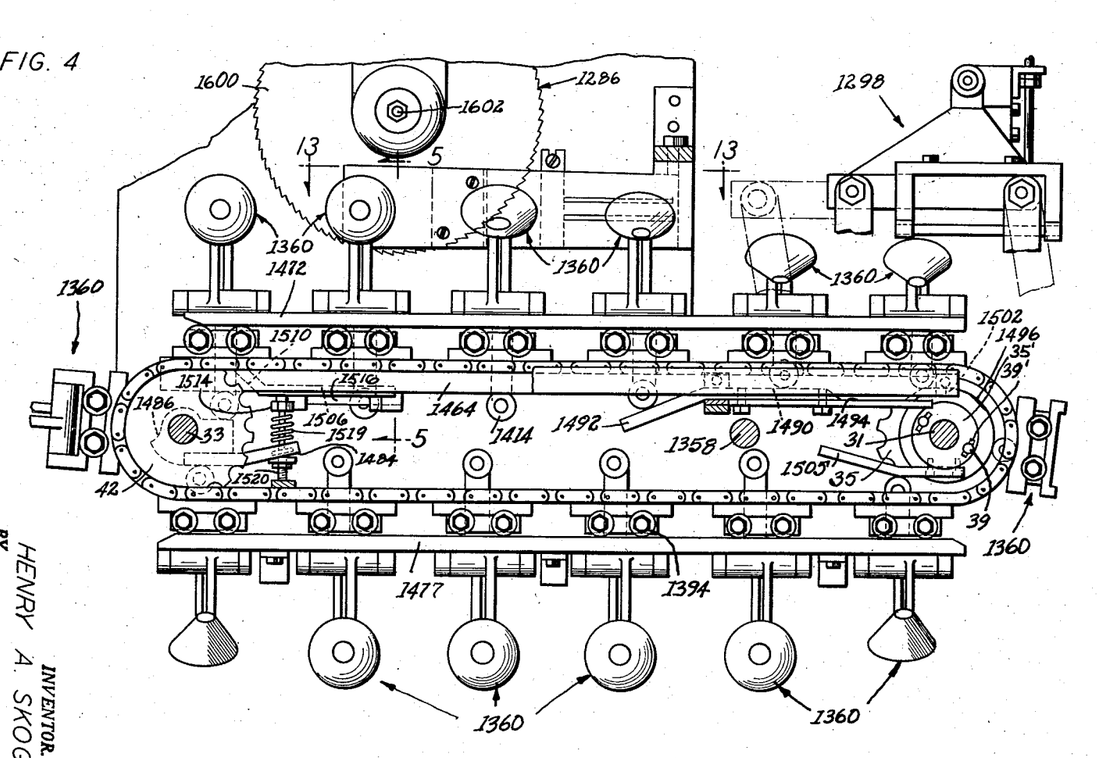
Fig. 4 is a fragmentary view in vertical section taken substantially on the line 4—4 of Fig. 3.

The sprocket chains 22a and 22b, throughout their entire lengths, are provided with a series of equally spaced, whole fruit holders, cups or supporting devices 1360 (Fig. 4).

Figure 7:
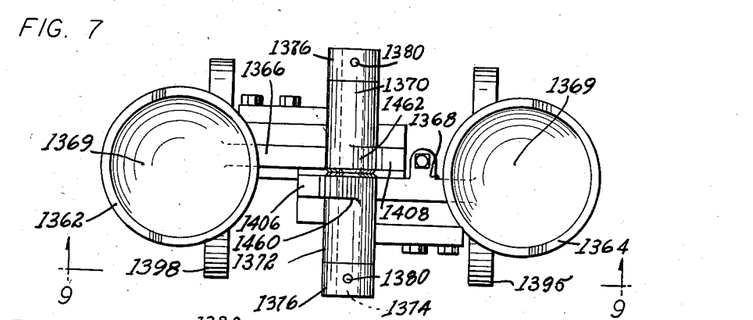
Fig. 7 is a fragmentary plan view looking along the line 7—7 of Fig. 9.
Figure 8:
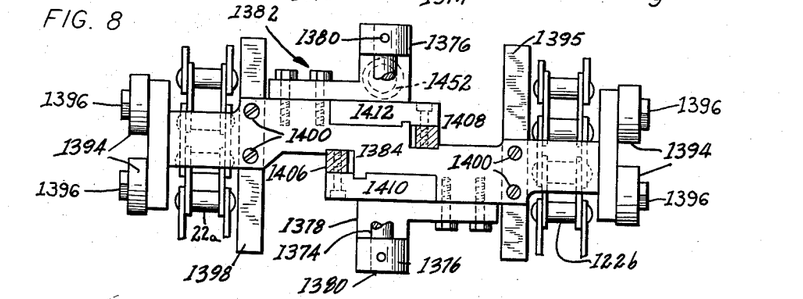
Fig. 8 is a fragmentary view in the horizontal section taken substantially along the line 8—8 of Fig. 9.
Figure 9:
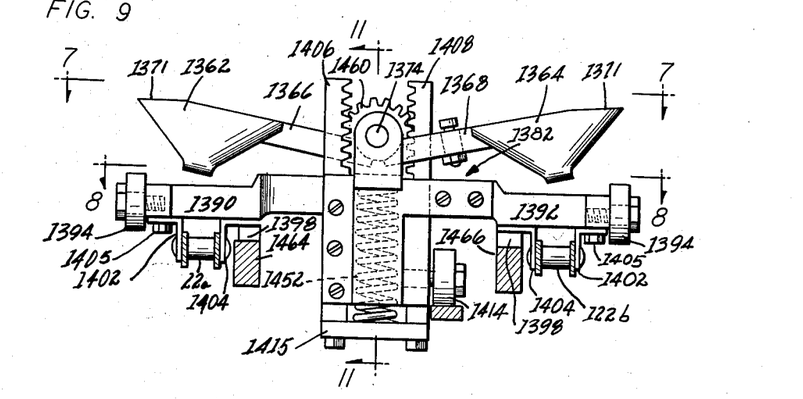
Fig. 9 is a fragmentary view in vertical section taken along the line 9—9 of Fig. 7.
Figure 10:
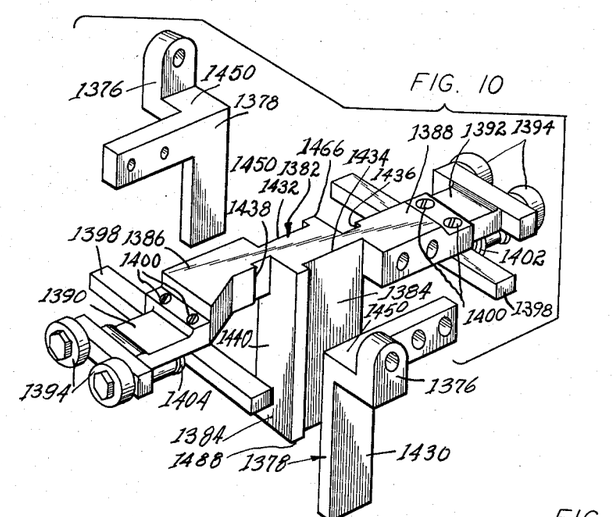
Fig. 10 is a view in exploded perspective of a traveling carriage for a fruit holder or cup unit for the splitting, spreading and pitting mechanism.
Figure 11:
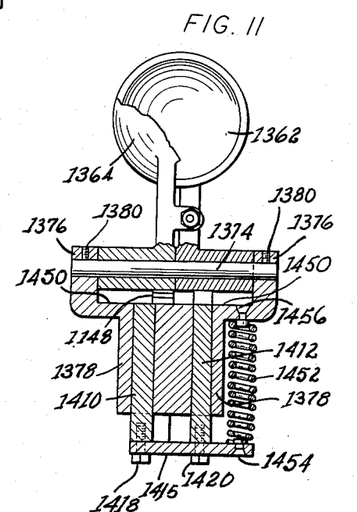
Fig. 11 is a fragmentary view in vertical section taken along the line 11—11 of Fig. 9.

Each whole fruit holder, cup or supporting device 1360 comprises a pair of half fruit holders, cups or cup sections 1362 and 1364, Figs. 7 to 9 and 11. The inner wall 1369 of each of these cups is conical in form and the outer edges of the rim of each cup is cut away or relieved as at 1371. Each cup section is an internally cone-shaped, half fruit holder when the cups are "open" or "partially open." The half cups when in horizontal lowered position, as illustrated in Figs. 7 and 9, form an open top, half fruit receptacle having conical internal surfaces. The two sections when in raised position, as illustrated in Figs. 4, 5 and 11, form closed, whole fruit receptacles or clamps having opposed, conical, internal walls confronting each other along their base planes, but in spaced relation to a vertical plane coincident with the suture plane of the whole fruit.

The cup segments or sections 1362 and 1364 are formed integrally with lever arms 1366 and 1368 having bosses 1370 and 1372 (Figs. 7 and 11) at their inner ends journaled on a shaft 1374. The shaft 1374 is mounted in bosses 1376 of opposite end brackets 1378, the shaft being held against rotation with respect to the brackets as by set screws 1380. The brackets 1376 are mounted on a carriage 1382 shown in Figs. 9 to 11. This carriage comprises a central dependent body portion or block 1384 (Fig. 10) and laterally extending arm portions 1386 and 1388 extending oppositely from opposite diagonal corners of the central body portion or block 1384. The end portions 1390 and 1392 of the arms 1386 and 1388 are offset oppositely so that their opposite side edges are aligned. Pairs of wheels or rollers 1394 are suitably journaled as at 1396 on each of the free ends of the portion 1390 and 1392 of the carriage. Carriage supporting shoes or slides 1398 are secured by screws or bolts 1400 to the undersurfaces of the portions 1390 and 1392 of the carriage. Chain attachment links 1402 and 1404 are bolted to the undersurface of the end portions 1390 and 1392 of the carriage arms 1386 and 1388, the chain attachment links 1402 being secured by bolts 1405, see Fig. 9, and the chain attachment links 1404 having their side flanges received in notches in the upper surfaces of the shoes 1398 and each secured to the carriage by one of the bolts 1400 by which its associated shoe is secured. It should be noted that the end portions 1390 and 1392 of the carriage arms 1386 and 1388 are recessed in their upper surfaces as shown in Fig. 9 to receive the bottom portions of the cup segments 1362 and 1364 so that the cup segments may be swung into an open horizontal or near horizontal position as shown in Fig. 9.

Figure 5:
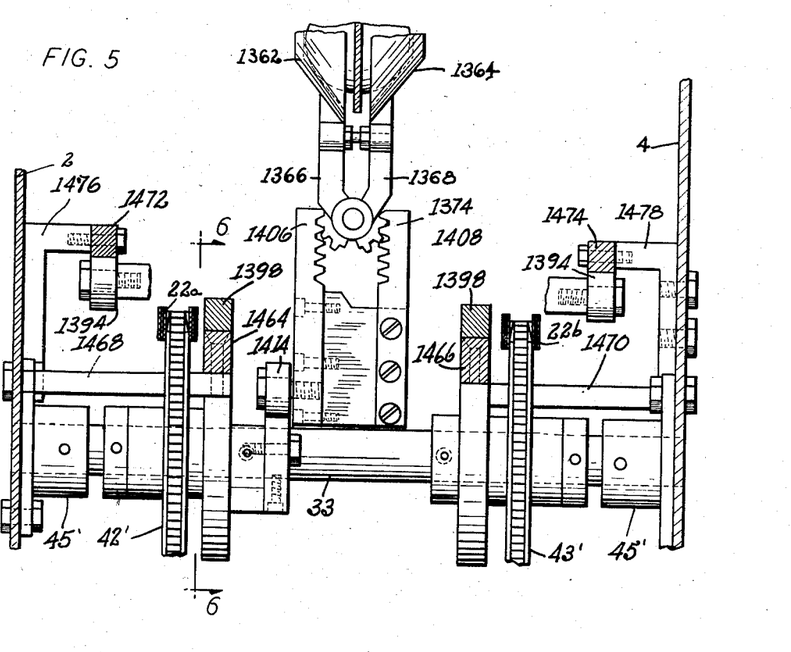
Fig. 5 is an enlarged fragmentary view in vertical section taken along the line 5—5 of Fig. 4.
Figure 12:
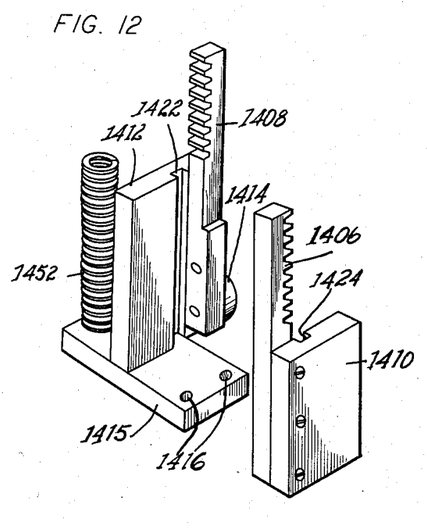
Fig. 12 is a view in vertical perspective of the cup actuating racks of the fruit holding unit or cups of Figs. 4 to 11.

The cup halves 1362 and 1364 are operated by racks 1406 and 1408, Figs. 5, 9 and 12, the rack 1406 being bolted to one edge of a slide block 1410 and extending upwardly therefrom while the rack 1408 is bolted to the opposite side edge of a like block 1412. An actuating roller 1414 is journaled on a bolt threaded into the side of the rack 1408 adjacent its lower end. The blocks are secured to a lateral extension or arm 1415 having spaced holes 1416 receiving bolts 1418 and 1420 fastening the parts. The blocks 1410 and 1412 are formed on their inner surfaces with longitudinally extending guide slots 1422 and 1424 receiving guide projections or splines 1426 and 1428 respectively formed at diagonally opposite corners of the central body portion 1384 of the carriage. The mounting brackets 1378, Figs. 8 and 10, for the cup carrying shaft 1374 are formed with horizontal arms apertured to receive mounting bolts by which the arms are secured to opposite edges of the arms 1386 and 1388 of the carriage 1382. The brackets are also formed with depending portions 1430, cooperating with the vertical, recessed surfaces 1432 and 1434 of the central block 1384 of the carriage to form spaced guide surfaces for the slide blocks 1410 and 1412 carrying the racks 1406 and 1408. Recesses 1436 and 1438, formed in the edges of the arms 1386 and 1388, cooperate with the opposed side surfaces 1440 of the body portion 1384 to form guide surfaces for the racks 1406 and 1408. Each bracket 1378 is also formed with a horizontal shelf portion 1450, see Fig. 10.

A spring 1452, Figs. 8, 9, 11 and 12, urges the cup segments to raised position or to a position substantially at right angles to the carriage 1382. This spring 1452 is a coil spring which at its lower end encircles a pin 1454 and bears upon the extension or arm 1415, see Figs. 9 and 11, and encircles at its upper end a pin 1456 and bears upon the underside of the shelf-like portion 1450 of the bracket 1378 with which the slide block 1412 is associated.

It should be noted that the rack 1406 meshes with gear teeth 1460 (Figs. 7 and 9) formed on the mounting boss 1372 for the cup segment 1364 while the rack bar 1408 meshes with the gear teeth 1462 formed on the mounting boss for the cup segment 1362. Hence, as the racks 1406 and 1408 are lowered the cup segments 1362 and 1364 are raised and as the racks 1406 and 1408 are raised the cup segments are lowered.

Each cup holder carriage 1382 is confined or restricted, in its movement along the upper flights of the chains or conveyor, to a definite horizontal plane without deviation or deflection therefrom as it passes from the front end of the machine to the rear end of the machine between the sprockets 42' and 43', Figs. 1, 4 and 5, and the drive sprockets 35, Figs. 1 and 4. This confining, restricting or guiding of the movements of each carriage 1382 is accomplished by a pair of guide tracks 1464 and 1466, Figs. 3 to 6, mounted on the outer ends of brackets 1468 and 1470 respectively secured to the side frame plates 2 and 4. The guide tracks 1464 and 1466 cooperate with the slide shoes 1398 secured to the under surface of each carriage 1382, the shoes riding on the upper surfaces of the guide tracks 1464 and 1466 so as to support the carriage against movement in a downward direction. The rollers 1394 at the opposite sides of each carriage 1382 engage and roll along overhanging guide tracks 1472 and 1474, Figs. 4 to 6, supported on the outer end of brackets 1476 and 1478 respectively secured to the side frame plates 2 and 4. The guide tracks 1472 and 1474 serve as a guide confining the carriages against upward movement from the front to the rear of the machine along the upper flight of the chains or conveyor. It will be evident that the confining or guiding tracks 1464, 1466, 1472 and 1474 serve not only a guiding function but also serve a clamping function in that they clamp the carriage against vertical movement so that by forces applied to the rollers 1414 or by springs 1452 to the slide block 1412, the racks 1406 and 1408 may move up or down to swing the cup segments to the various positions. These tracks serve also to take the load of the carriages off the chains so that relatively light sprocket chains or conveyors may serve to move the carriages and hence convey the fruit holders through their designed path. The movements of the carriages along the lower track of the chains or conveyor, from the rear to the front end of the machine, are guided and the carriages supported by tracks, as 1477, Fig. 4, similar to tracks 1464 and 1466 and similarly secured to the outer end of brackets (not shown) secured to the side frame plates 2 and 4. The rollers 1394 of each carriage engage and roll on the upper surfaces of the tracks 13477 and thereby support the weight of the carriages and thereby relieve the chains of that weight and decrease the bearing pressure on shafts 31 and 33. The cup segments are moved to open positions or to partially open positions, and allowed to move to closed positions as they are moved continuously along their endless path by a plurality of cam, guide or control tracks, engaging the rollers 1414, as best seen in Figs. 3 to 6. These tracks comprise a plurality of generally flat tracks 1481, 1483 for controlling the cup segments, the track 1481 extending from a rear, inclined cam surface 1484 to a forward cam surface 1485 concentric to the axis of the shaft 33. The cam surface 1485 terminates in an abrupt, convex cam surface 1486

(permitting rapid closing of the cup sections). The cam surface 1486 is followed by a cam surface 1487, concentric to the shaft 33 and extending from surface 1486 to the flat track 1483.

Figure 6:
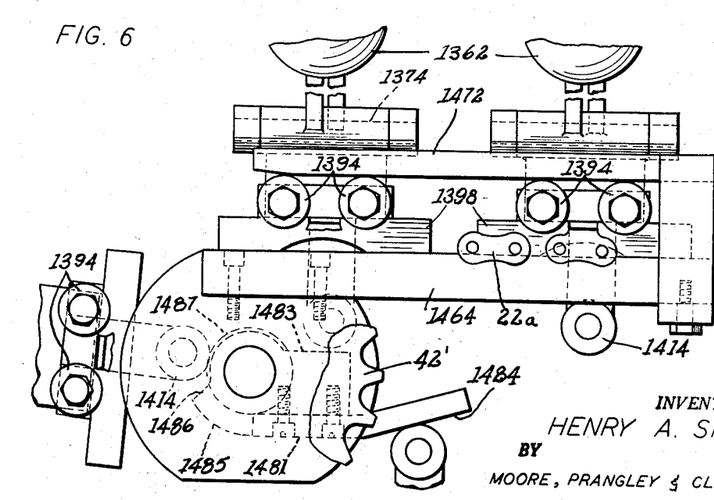
Fig. 6 is a fragmentary view in horizontal section taken along the line 6—6 of Fig. 5.

A track 1490, adjacent the rear sprocket, controls the positioning of the two cup segments in partially open position for cooperation with the pitting or deseeding mechanism. This track is aligned longitudinally of the machine with track 1483 so as to engage the actuating roller 1414 of the cup segments. This track 1490 has at its forward end an inclined, camming section 1492 which engages and raises the actuating rollers 1414. This track has also an intermediate recessed portion or surface 1494 which permits the actuating roller 1414 to drop down, thereby raising the cup segments slightly to position the fruit halves in proper engagement with the pitting mechanism. The track 1490 at its rear end merges into a curved track or surface 1496 which is concentric to the axis of the drive shaft 31. The guide surface 1496 may be provided by a disk or collar in which the shaft 31 is journaled but which is held against rotation by being pinned or otherwise secured to the stationary track 1490, the track 1490 being fixed to brackets 1500, Fig. 3, secured to the carriage track 1464. It should be noted that the portion 1502 of the track 1490 between the recessed portion 1494 and the arcuate surface 1496 is of greater height or thickness than the flat portion of the track in advance of the recess 1494 so that while the cup sections are partially opened as the cup control rollers 1414 reach the recess 1494 they are fully opened as the cup rollers 1414 pass from the recessed portion 1494. The arcuate surface 1496 retains the cup sections in fully open position as the rollers 1414 move around the drive sprockets 35. The tracks 1481 and 1483 may be secured in any convenient manner, as by brackets 1504, Fig. 3 (of which one only is shown) to the carriage track 1464, the tracks 1464 and 1466 having at their forward ends concentric circular surfaces interfitting concentric, recessed surfaces in the shoes 1398 as shown in Fig. 6.

A cam track 1505, Fig. 4, extending forwardly from the cam surface 1496 retains the rollers 1414 in lowered position until they pass forwardly beyond the shaft 31 and parts secured thereto.

In addition, an auxiliary control device, track or guide 1506 (Figs. 3 and 4) is provided for actuating the roller 1414 of the cup segments to supply an auxiliary additional tension to the cups during the splitting or sawing operation. The track 1506 comprises a bar extending longitudinally in alignment with the plane of the track 1483. Track 1506 is provided at its forward end with an inclined cam surface 1501 under which the roller 1414 is adapted to pass and to be depressed by the track as the cup carrier advances. The track 1506 is mounted on spaced bars 1512 and 1514, the bar 1512 being secured to a rod 1516 journaled in spaced brackets 1518 bolted to the under surface of the carriage track 1464. The bar 1514 is also secured to the rod 1516 but passes beyond said rod to overlie at its free end a coil spring 1519 which bears at its lower end on a washer adjustably mounted on a vertical rod 1520 (Fig. 4) supported by and upstanding from a bracket 1522 bolted to the side frame plate 2, the other end of the spring 1519, acting through the pivoted bar 1514 to depress the track 1506.

The splitting or sawing mechanism 1286 comprises, as best shown in Figs. 1, 2, 4 and 13, a rotary saw 1600 secured to a shaft or arbor 1602 which is journaled in an arbor housing 1604 that extends through a suitable opening in an upstanding portion of the side plate 4. The arbor housing is secured to said side plate as by brackets 1606 bolted to the end of the arbor housing and also bolted to the side plate. The arbor shaft 1602 extends beyond the arbor housing 1604 on the right side of the machine as shown in Fig. 2 and has secured to it a pulley driven by a belt 1610 in turn driven by a pulley 1612 secured to the high speed shaft 29b of the combined motor and speed reducer 29. The shaft 1602 also has secured to it a fly wheel 1614 which equalizes the rim speed of the saw while the pit of the peach is being cut in two.

The saw arbor housing 1604 is also supported by a bracket 1616 having an upper horizontal plate portion 1618, Fig. 1, bolted to the top plate 3 and a lower horizontal plate portion 1620 bolted to the saw arbor housing.

Figure 13:
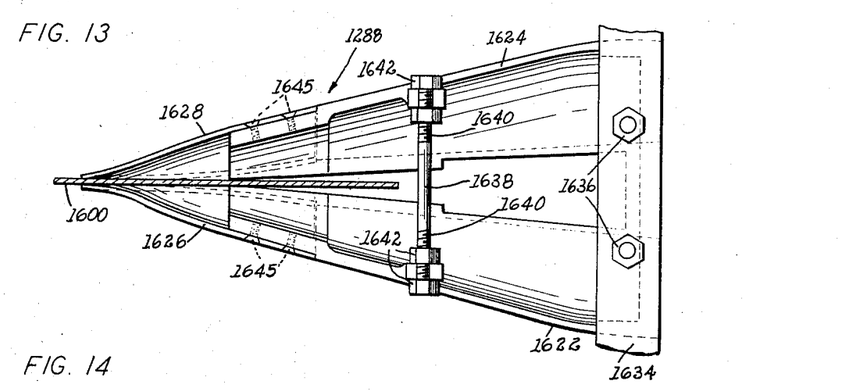
Fig. 13 is an enlarged view in vertical section taken substantially along the line 13—13 of Fig. 4.
Figures 14, 15:
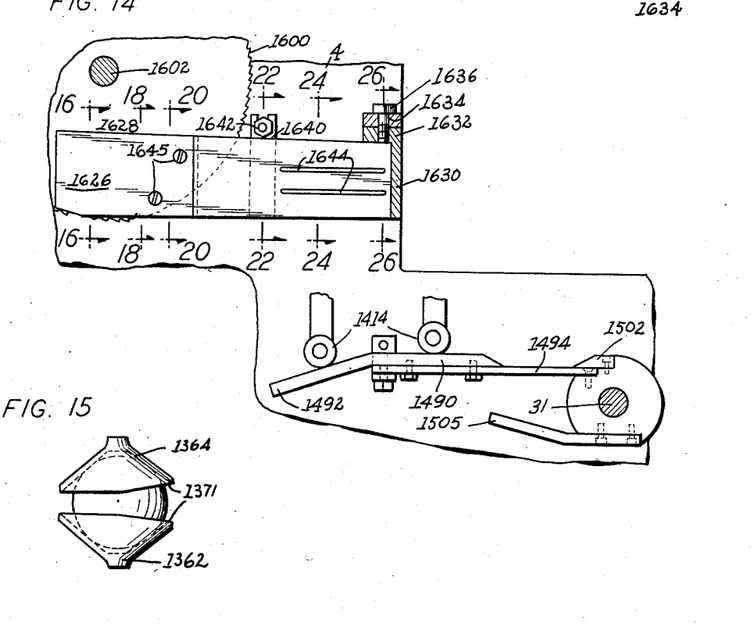
Fig. 14 is a diagrammatic view in elevation of the spreader unit of Fig. 13 illustrating the location of the cup control cam in relation to the spreader unit.
Fig. 15 is a fragmentary plan view of the cup unit holding the peach.

The separating or spreading mechanism 1288 comprises four stationary separating or deflecting blades or members 1622, 1624, 1626 and 1628, Fig. 13, the members 1622 and 1624 being formed at their rear ends with an integral cross member including a vertical wall 1630, Fig. 14, and a horizontal bar 1632. The bar 1632 is mounted on a cross member 1634 as by bolts 1636, the cross member 1634 being secured in any desired manner to the upstanding portions of the side plates 2 and 4. The spreader members 1622 and 1624 are adjustably connected and reinforced intermediate their ends by a cross rod 1638 received in notches in the upper ends of reinforcing straps 1640 spot welded or otherwise fixed to or formed integrally with the spreader members. The cross rod 1638 is adjustably secured to each of the straps 1640 by means of opposed clamping nuts 1642. By adjusting of the rod 1638 and the clamping nuts 1642 the spacing of the spreader members 1622 and 1624 may be adjusted relative to the saw 1600 to obtain the proper clearance between the saw and the spreader blades.

The front spreader members 1626 and 1628 comprise sheet metal members fastened at their rear ends as by screws 1645 appropriately countersunk in the spreader plates 1626 and 1628 so as to be flush with the surface of those plates. The spreader plates 1626 and 1628 closely approach at their forward ends the plane of the saw 1600 and may be beveled at their forward edges so that the fruit halves split or sawed by the blade 1600 pass readily from the saw blade onto the opposite surfaces of the spreading or deflecting members 1626 and 1628. The form of the spreader members or blades 1622, 1624, 1626 and 1628 will be evident from Figs. 13, 14, and 16 to 25. As clearly illustrated in Fig. 13, the spreader member formed by the spreading or deflecting blades 1622 and 1626 on the one side and the spreader member formed by the deflecting blades 1624 and 1628 on the other side diverge from their forward to their rear end in a horizontal plane and as evident from Figs. 16 to 25, diverge from bottom to top in a vertical plane.

Figures 16, 17, 18, 19, 20, 21, 22, 23, 24, 25:
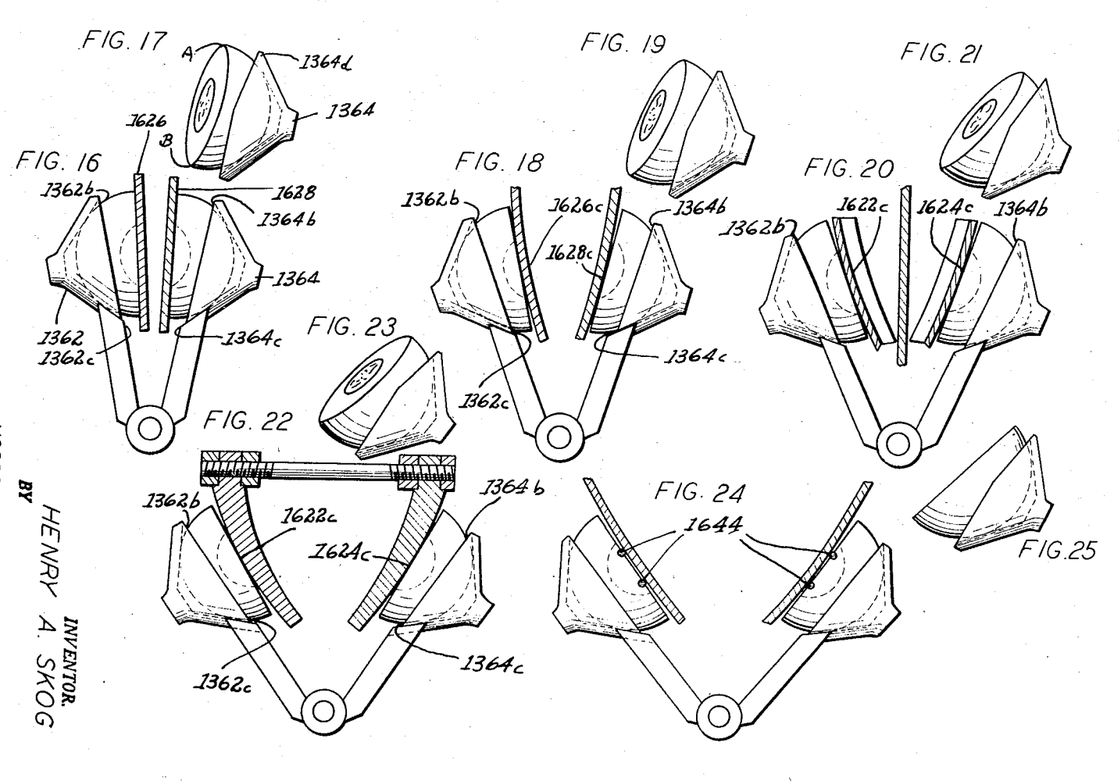
Figs. 16 to 26 are operation diagrams illustrating the spreading of the fruit halves and the opening of the cups as they are conveyed past the spreader unit, Figs. 16, 18, 20, 22, 24 and 26 being taken along position lines 16—26 respectively, of Fig. 14.

The forward end portions of the blades in horizontal sections are substantially parallel to the saw as can be seen in Fig. 13, and in vertical sections they diverge from bottom to top quite gradually, as will be seen from Fig. 16. These forward end portions thus effect a gradual divergence of the peach halves from the plane of the saw while they are engaged by or in contact with the splitting saw.

Just in advance of the transverse plane, represented by the section line 18—18 in Fig. 14, the spreader blades 1626 and 1628 begin to bow or curve outwardly slightly, as illustrated in Fig. 18, and are thereafter of constantly and gradually increasing curvature in a vertical plane, as seen in Figs. 20 and 22, until the transverse plane 22—22 is reached, after which the spreader blades are of rapidly decreasing curvature, as seen in Fig. 24. Between the vertical planes, indicated by line 18—18 to 24—24 in Fig. 14, the blades 1626—1628 and the blades 1622—1624 diverge in a horizontal plane at a uniform increment so as to effect a uniform horizontal spreading of the peach halves and of the cups in which the peach halves are carried. The forward end of the doubly-divergent, convex portions of the spreader blades merges gradually into the forward end portions of the spreader blades, as shown in Fig. 13. The rear end portions of the spreader blades 1622 and 1624 are provided with horizontal wires 1644 to prevent the peach halves from turning in the cup sections as they approach the spread-apart position which they will occupy during the pitting operation.

Applicant has found that movable spreader blades or wings restrict or limit the capacity of a continuously moving pitting machine and a smoother action in spreading the fruit and the carrying cups is necessary as the speed and hence the capacity of the machine are increased. It is difficult to illustrate the exact relative positions of the peach halves as the fruit is moved along the spreader blades, as these positions will vary somewhat depending upon the size of the peach. In the illustrative diagrams of Figs. 16 to 26, the relative positions of the half peaches in the cups are represented for an average size peach of approximately 3″ in diameter.

During the time the peach halves travel over the spreader blades, the peach halves are pressed toward and into contact with the spreader blades by the spring 1452 which urges the cup sections toward each other.

In Figs. 16, 18, 20, 22 and 24, the peach halves are illustrated as though they were traveling on a horizontally straight surface rather than on surfaces of continually increasing divergence in a horizontal plane. These views, however, serve to show that as the peach travels along the horizontal path, each half peach turns in its cup on a horizontal axis. Thus, it will be noted that as each half peach passes over its spreader blade surface, the distance between the edge 1362b of the cup section 1362 and the spreader blades 1626 and 1622 decreases while the distance between the lower edge 1362c of the cup section and those spreader blades increases. Similarly, as shown in Figs. 16, 18, 20 and 22, as the opposite peach half travels horizontally along the spreader blades, the distance between the upper cup edge 1364b and the spreader blades 1628 and 1624 decreases while the distance between the spreader blades and the lower edge 1634c of this cup section increases. These distances decrease and increase respectively until the peach has reached the position shown in Fig. 24, after which the turning of the peach halves in the cup sections is prevented by the wires 1644.

Figs. 17, 19, 21, 23 and 25 are plan views looking down upon the peach half in the cup section 1364. From these views it will be noted that the distance between the leading edge A of the peach half and the leading edge 1364d of the cup section 1364 decreases while the distance between the trailing edge B of the peach half and the trailing cup edge 1364e of the cup section 1364 increases as the peach half moves along the spreader plates 1628 and 1624. It will be understood that the peach half in the cup section 1362 similarly moves in that cup section as exemplified in Figs. 19, 21, 23 and 25. Thus, as shown in these figures, the peach halves also turn in the cups on vertical axes. Experience in the use of the machine clearly demonstrated that notwithstanding this turning of the peach halves in the cups about both horizontal and vertical axes, the long axis of the pit is not moved out of its predetermined position or orientation with respect to the longitudinal axis of the machine. The theory why this maintenance of orientation takes place is not clearly understood. However, it is believed that the engagement of the hard flat surface of each half peach with the crown of the curve of each spreader blade, at points 1626c, 1628c, 1622c and 1624c enables these crown points of the curve of the spreader blades to act as fulcrum points for the turning of the peach halves about horizontal axes, which fulcrum points lie in the long axes of the pits so that the long axes of the pits in effect serve as the horizontal axes of turning of the peach halves occasioned by the vertical divergence of the spreader blades. As each half peach moves along the spreader blades, the flesh of each peach half slightly folds itself around the long curve of the spreader blades, thereby keeping the long axis of each pit in proper position of orientation longitudinally of the machine even though the peach is turned about vertical and horizontal axes relative to the cup sections.

In Fig. 16 the half peaches are shown as traveling across the surface of the spreader blades in advance of the curved portions thereof, at which time the peach halves have just been released from the effects of the added pressure of the spring 1519, and therefore do not start to turn in the cup sections until the exposed surfaces of the half pits engage the crown points of the convex surfaces of the spreader blades.

As the peach halves approach the position shown in Figs. 24 and 25, the roller 1414 for actuating the cup sections reaches the inclined end 1492 of the cam track 1490 and the cup sections begin to swing outwardly under the action of the cam track. Between that position and the position shown in Fig. 26, the peach halves continue to move along surfaces of the diverging spreader blades which are substantially flat in vertical section and the wires 1644 prevent turning of the peach halves in the cup sections while the continuing divergence of the spreader blades cause the peach halves to move outwardly or to be spread with the outwardly spreading cup sections so that the peaches remain fully seated in the cup sections until said sections have been spread apart sufficiently for the peach halves to remain seated in the cup sections by the action of gravity. The wires 1644 also establish restricted areas or zones of sliding contact between the spreader blades and peach halves so as to overcome the tendency of the peach halves to stick to surfaces in which they are in face to face contact.

The cut away leading edges 1371 of the cup sections, as illustrated in Fig. 15, permit smaller peaches to be firmly held against the spreader blades. Applicant found that with the smaller peaches the cup sections, unless relieved along the leading edges, as shown in Fig. 15, would so confine or grip the peaches that they could not turn relative to the cup sections while moving along the spreader blades, and the orientation thereof was, at times, adversely affected by the spreader blades. Thus, at times, the smaller peaches would not be properly presented to the pitting mechanism and the pit cavities formed in the peach halves would be out of line with the stem blossom axis of the half peaches. Applicant found that the relieving of the leading edges of the peach cups cured the difficulty by enabling the smaller peaches to be held firmly against the spreader blades.

The pitting, deseeding or coring mechanism 1290, Fig. 1, is constructed as more specifically described in said co-pending application Serial No. 200,705, and comprising, in general, frame 1770 (Figs. 1 and 4) moved "forwardly" with respect to the moving fruit cups (but rearwardly of the machine) from the "rearward" position shown in dotted lines in Fig. 1 to the "forward" position shown in full lines in said figure, by a stud 1794, Fig. 3, on which is journaled a cam roller 1796 received in an internal cam track of a cam 1798 secured to the end of the shaft 1358.

As described in said co-pending application Serial No. 200,705, the pitter headframe carries a pair of pitter mechanisms; a pair of pitter pad and knock-out assemblies; and a pair of pitter knife operating mechanisms and auxiliary pressure means for engaging the cups and pressing the fruit halves firmly into engagement with the pitter pads during the movement of the pitter knives through the fruit halves.

A cam 2002, Fig. 3, secured to the shaft 1358 adjacent the pitter head actuating cam 1798 operates a pitter knife actuating lever 2004 which carries at its lower end a stud on which is journaled a cam roller 2012, the lever being urged in a counterclockwise direction, as seen in Fig. 1, so as to maintain the cam roller 2012 in engagement with the cam 2002 by a coil spring as described in said application. The rotation of the cam 2002 causes actuation of the pitter knives to pit simultaneously both pit halves, as described in said co-pending application.

It should be noted that the cup closing spring 1452 supplies a compressive force urging the cut surfaces of the fruit halves into engagement with the pitting pad assemblies. Auxiliary means as described in said co-pending application provides additional or auxiliary compressive forces urging the cut faces of the fruit halves into engagement with the pitting pads during the swinging of the pitting knives about the half pits. This means 2062 comprises, as best shown in Fig. 1, brackets as 2064 bolted to the longitudinal arms of the pitter head frame 1770. Each of these brackets is formed with integral spaced depending arms terminating at their lower ends in bosses for a shaft 2072. A lever 2076 is fastened to the inner end of each shaft 2072, each lever carrying at its free end a roller 2080 for engaging and pressing the cup sections 1362 and 1364 upwardly and toward the pitting pads when the shafts 2072 are actuated. One shaft 2072 is actuated by means of a yoke 2084 fastened to the shaft 2072 and connected by a universal joint 2088 to a vertical actuating rod 2090. The other shaft 2072 is connected with the actuating yoke 2084 as described in said co-pending application for simultaneous actuation. The vertical actuating rod 2090 is slidably received relatively adjacent its lower end in a suitable block (not shown) pivoted to the outer end of a lever 2100. A coil spring 2104 is interposed between a collar 2106 bearing against the under surface of said block and a nut 2108, threaded on the lower end of the actuating rod 2090. The lever 2100 is pivotally mounted on a headed stud or bolt 2110 secured to the side frame plate 2 and carries a cam roller 2112 operated by an actuating cam 2114 fastened to a shaft 2116 journaled in a suitable bracket, not shown, secured to the side frame plate 2. The shaft 2116 is provided with a drive gear 2118 to mesh with the chain conveyor drive gear 1356. The cam roller 2112 is maintained in engagement with the cam 2114 by a coil spring 2120 mounted on a rod 2122 slidably mounted in the laterally extending shelf of a bracket 2124 fastened to the side frame plate 2. The coil spring 2120 is interposed between a spring retainer carried by the shelf of the bracket 2124 and a nut and washer 2126 secured to the upper portion of the rod 2122, the rod being secured at its upper end to a yoke pivotally secured to the lever 2100. The coil spring 2120 serves not only to maintain the roller 2112 in engagement with the cam 2114 but also, being normally stronger than the spring 2104, serves normally to maintain the rod 2090 in elevated position so that the rollers 2080 are out of the path of the traveling pitter cups. The spring 2120 acts upon the rod 2090 through the lever 2100 and a collar 2130 adjustably fastened to the rod 2090. When the cam 2114 depresses the roller 2112, and thereby depresses the lever 2100, the spring 2120 is rendered ineffective to urge the rod 2090 upwardly and the spring 2104 is compressed thereby urging the rod 2090 downwardly and thereby rotating the shaft 2072 in a counterclockwise direction, as seen in Fig. 1, while rotating the other shaft 2072 (not shown) in a clockwise direction so that the rollers 2080 engage the cup sections 1362 and 1364 and thereby apply the additional compressive force of the spring 2104 to the fruit halves thus urging the cut surfaces of the fruit into still firmer engagement with the pitting pads.

The combined motor and speed reducer 29 continuously drives the conveyor 30, as previously described, by continuously rotating the shaft 31 in a clockwise direction, as seen in Fig. 1, to cause the upper flights of the conveyor chains 22a and 22b to pass from the sprockets 42' and 43' to the sprockets 35.

As a cup unit 1360 approaches the forward end of the conveyor the cup actuating roller 1414 of that unit engages the cam track 1484, thereby opening the cup unit which therefore remains in open position until the roller 1414 reaches the cam surface 1486, Figs. 4 and 6, which position it reaches just prior to the insertion of the whole peach, as described in said co-pending application. As the cam roller 1414 passes over the cam surface 1486 the cup unit 1360 is closed by the action of its spring 1452 so as to engage and grip the peach.

Figure 26:
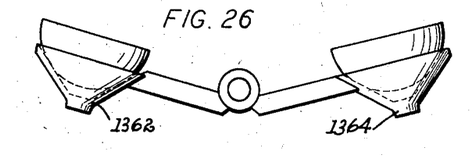

The cup unit 1360, having grasped the peach in its suture plane coincident with the central longitudinal plane of the machine, carries the fruit then past the rotating saw which splits the flesh and pit of the fruit along the suture, the saw being positioned in the central vertical plane of the machine. The cup unit then carries the fruit halves over the doubly divergent and curved stationary spreader blades 1620 to 1628, as previously described, to spread apart the fruit halves and the cup sections in which the fruit halves are contained, all as shown in Figs. 16 to 26, the fruit halves turning in and relative to the cup sections about a vertical axis and about a horizontal axis substantially about the point of contact of the hard pit with the crown of the vertically curved portion of the spreader blades. The wires 1644, Figs. 14 and 24, preclude further turning of the fruit halves as the fruit is carried past the rear portion of the spreader blades 1622 and 1624 and serve to break the suction between the sticky cut surfaces of the flesh of the fruit halves and the surfaces of the spreader blades. As the fruit halves pass along the wires 1644, the actuating roller 1414 moves into engagement with the inclined track section 1492 and the cup sections are swung to open position, as shown in Fig. 26, so as to pass beneath the traveling pitter frame 1770 and below the pitter pad assemblies. The pitter headframe, mounted on pivoted parallel links 1780 to 1786, moves "forwardly" at the same rate as the continuously moving half fruit cups 1362 and 1364, traverse an arc of movement, of which the highest point is at the end of the forward movement of the pitter headframe. By the time the roller 1414 of the fruit cup unit 1360 reaches the entering end of the notch 1484 in the cam track 1490, the half peaches are vertically aligned with the pitting pad assemblies and the cup closing spring 1452 swings the half fruit cups upwardly to bring the cut surfaces of the fruit halves into engagement with the pitting pads. During the movement of the actuating roller 1414 through the notch in the cam track, the cam 2002, Fig. 19, causes rotation of the shafts 2072 in such direction as to bring the rollers 2080 into engagement with the cup sections 1362 and 1364 and thereby apply the additional spring pressure, provided by spring 2104, to the fruit cups and therethrough to the fruit halves thereby to increase the compressive forces urging the flesh of the fruit against the apertured pitting pads. While the fruit halves are thus firmly pressed against the pitting pads, cam 2002 actuates pitting mechanisms so as to cut around the pit.

The pitting knives having completed their movement, the cup actuator roller 1414 reaches the section 1502 of the cam track 1490 thereby again swinging the cup sections outwardly to open position and away from pitting pad assemblies, while the cam 2114 actuates the lever 2100 to swing the rollers 2080 and 2082 out of the path of the cup units as they move downwardly, and the cam 2002 causes the return of the pitting knives. The fruit cup units 1360 continue their movement toward the rear of the machine, while the cam 1798 causes the pitter headframe 1770 to reverse its direction of movement and return to its starting position in time to meet and again move forwardly with the next oncoming cup unit. As the cup unit carries the simultaneously pitted fruit halves past the rear end of the conveyor, the fruit cups being in open position, the pitted fruit halves are discharged by gravity from the cups onto a suitable receptacle or into a suitable conveyor or belt by which they are carried to suitable packing mechanisms or further peach processing mechanisms. As the cup units 1360 pass about the end of the conveyor, they are swung to closed position depending vertically from the lower flight of the conveyor and in this closed position they remain until they again arrive at the point where the cup actuating roller 1414 engages cam track 1484, as previously described, and are swung to open position for the receipt of a next peach.

It is apparent that many widely different embodiments of this invention may be made without departing from the spirit and scope thereof, and therefore, it is not intended to be limited except as indicated in the appended claims.

The invention is hereby claimed as follows:

1. In a fruit treating machine, a splitter blade for splitting a fruit, means adjacent said splitter blade for separating the fruit halves after splitting, said means comprising a pair of separator blades having forward portions extending generally parallel to the splitter blades on opposite sides thereof and rear portions diverging in both vertical and horizontal directions and of increasing vertical convexity in the direction of passage of the fruit halves over the separator blades.

2. In a fruit treating machine, a splitter blade for splitting a fruit, means adjacent said splitter blade for separating the fruit halves after splitting, said means comprising a pair of separator blades having forward portions extending generally parallel to the splitter blade on opposite sides thereof and rear portions diverging in both vertical and horizontal directions, said separator blades being first of increasing convexity in vertical section and then of decreasing convexity in vertical section.

3. In a fruit treating machine, means for dividing whole fruit along one plane while the same is moving, means for deseeding the fruit divisions while moving with their seed containing surfaces facing uppermost and in angularly disposed planes, continuously moving fruit conveyor means, fruit holder means connected to and swingably mounted relative to the conveyor means for receiving whole fruit and carrying the whole fruit past said dividing means and all the fruit divisions past the deseeding means with their seed containing surfaces facing uppermost and in angularly disposed planes as the conveyor means moves continuously, and stationary divergent spreader members between said dividing means and said deseeding means for moving the fruit halves and fruit holders away from each other sufficiently for the fruit to be retained by gravity in the holders as the fruit passes from the dividing means to the deseeding means.

4. In a fruit treating machine, means for feeding fruit at a uniform rate along a predetermined path, said feeding means including fruit holders relatively movable angularly of said path, fruit splitting means mounted in said path, means for moving said holders angularly toward each other in advance of said splitting means to receive a whole fruit, fruit separating means mounted in said path in position to engage and angularly shift the fruit halves and holders relatively away from each other after splitting of the fruit by said splitting means, said fruit separating means including divergent spreader members constructed and arranged to shift the fruit and fruit holders sufficiently apart for the fruit halves to be retained by gravity in said holders, and fruit deseeding means mounted for to and fro movement parallel to said path and engageable simultaneously with the fruit halves in the angularly shiftable holders to pit both halves of the fruit.

5. In a fruit treating machine having a conveyor and fruit holders shiftably mounted on the conveyor for receiving whole fruit, splitter and spreader means comprising a splitter past which the whole fruit in said holders are carried on movement of said conveyor, and separator blades having forward end portions extending at their forward ends in juxtaposition to the splitter and rearwardly therefrom, said separator blades having forward portions diverging in both vertical and horizontal directions and having flat surfaces engaging the cut surfaces of the fruit halves as they pass from the splitter, said separator blades having intermediate portions diverging in both vertical and horizontal directions and being vertically bowed, said vertically bowed intermediate portions being first of constantly increasing convex curvature facing the fruit halves and then of rapidly decreasing convex curvature whereby to cause the fruit halves to turn in the holders to maintain the long axis of the pits in predetermined alignment as the fruit halves and holders are spread apart by the spreader means and said blades having rear portions with planar surfaces.

6. In a fruit treating machine as set forth in claim 2 wherein the surfaces of the separator blades which are of decreasing convexity in vertical section are provided with means forming ribs to prevent turning of the fruit halves.

References Cited in the file of this patent
UNITED STATES PATENTS

| | | |
|---|---|---|
| 1,739,995 | Turner | Dec. 17, 1929 |
| 2,257,341 | Jepson | Sept. 30, 1941 |
| 2,428,157 | Healy | Sept. 30, 1947 |
| 2,568,947 | Carroll | Sept. 25, 1951 |
| 2,673,583 | Skog | Mar. 30, 1954 |